United States Patent [19]

Ichikawa

[11] Patent Number: 5,237,339
[45] Date of Patent: Aug. 17, 1993

[54] ELECTROPHOTOGRAPHY APPARATUS

[75] Inventor: Toshiyuki Ichikawa, Numazu, Japan

[73] Assignee: Tokyo Electric Co., Ltd., Tokyo, Japan

[21] Appl. No.: 665,779

[22] Filed: Mar. 7, 1991

[30] Foreign Application Priority Data

Mar. 14, 1990 [JP] Japan .................................. 2-62895

[51] Int. Cl.$^5$ .......................................... G01D 15/14
[52] U.S. Cl. ........................................... 346/107 R
[58] Field of Search ............. 346/107 R, 160, 76 PH; 340/661, 662; 324/522, 537

[56] References Cited

U.S. PATENT DOCUMENTS

| | | | |
|---|---|---|---|
| 4,052,694 | 10/1977 | Fredriksson | 324/537 X |
| 4,366,433 | 12/1982 | Imazeki et al. | 340/661 X |
| 4,459,583 | 7/1984 | van der Walt et al. | 340/661 X |
| 4,535,341 | 8/1985 | Kun et al. | 346/107 R |
| 4,595,935 | 6/1986 | Brooks et al. | 346/76 PH |
| 4,855,722 | 8/1989 | Mostyn et al. | 340/660 |
| 4,899,184 | 2/1990 | Leksell et al. | 346/160 |

FOREIGN PATENT DOCUMENTS

| | | |
|---|---|---|
| 0297603 | 1/1989 | European Pat. Off. . |
| 0335553 | 10/1989 | European Pat. Off. . |
| 59-57173 | 4/1984 | Japan . |
| 63-191657 | 8/1988 | Japan . |

OTHER PUBLICATIONS

Graf, Rudolf F. *Radio Shack Dictionary of Electronics* Howard W. Sams & Co., Inc., Indianapolis, Ind., 1974, p. 132.
Patent Abstracts of Japan, vol. 9, No. 118, May 23, 1985, Fujitsu KK, Method For Detecting Defect of Image Sensor.

*Primary Examiner*—Benjamin R. Fuller
*Assistant Examiner*—David Yockey
*Attorney, Agent, or Firm*—Frishauf, Holtz, Goodman & Woodward

[57] ABSTRACT

An electrophotography apparatus for performing exposure and recording of information onto a charged photosensitive body using a line head consisting of an array of a large number of EL elements, developing the information-recorded photosensitive body, and transferring a developed image onto a recording medium, includes a current detection unit for detecting peak values of AC currents flowing through electrodes of the EL elements when the EL elements emit light, and a discriminator for discriminating based on current detection outputs from the current detection means whether or not the EL elements are defective. In this arrangement, the EL elements of the line head are caused to emit light, peak values of AC currents flowing through the electrodes of the EL elements are detected, and whether or not the EL elements are defective is discriminated based on the detected current peak values.

7 Claims, 6 Drawing Sheets

FIG. 7A COMMON SIGNAL

FIG. 7B BLOCK SIGNAL

FIG. 8A COMMON CURRENT

FIG. 8B RECTIFIED VOLTAGE

FIG. 8C COM-I

FIG. 8D PH-CL

→ TIME

ELECTROPHOTOGRAPHY APPARATUS

BACKGROUND OF THE INVENTION

1. Field of the Invention

The present invention relates to an electrophotography apparatus for exposing a photosensitive body using a line head comprising an array of a large number of light-emitting elements.

2. Description of the Related Art

As a light-emitting element of this type, an EL (electroluminescence) element, or the like is known. For example, a printer called an EL printer, employs a line head comprising an array of a large number of EL elements to perform information recording on a photosensitive drum. More specifically, after the surface of the photosensitive drum, which surface is formed of a photoconductive material, is uniformly charged, the surface is exposed by light emitted from the EL elements, thereby recording image information in the form of an electrostatic latent image. The electrostatic latent image is developed with toner, and the toner image is transferred onto a paper sheet, thus performing a printing operation.

In an EL printer of this type, when EL elements cause an operation error, a nonuniformity or omission in printed data may occur, resulting in low printing quality. For this reason, the defective EL elements must be detected. In a conventional apparatus, all the EL elements of the line head are caused to emit light to perform a printing operation, and an error position is detected on the basis of a printed state.

However, when the defective EL elements are checked by performing a printing operation, the checking operation takes much time, and the defective EL elements may often be overlooked due to visual confirmation.

SUMMARY OF THE INVENTION

It is, therefore, an object of the present invention to provide an electrophotography apparatus which can quickly check defective ones of light-emitting elements constituting a line head, and can reliably detect defective elements.

According to the present invention, an electrophotography apparatus for performing exposure and recording of information onto a charged photosensitive body using a line head comprising an array of a large number of EL elements, developing the information-recorded photosensitive body, and transferring a developed image onto a recording medium, comprises current detection means for detecting peak values of AC currents flowing through electrodes of the EL elements when the EL elements emit light, and a discriminator for discriminating based on current detection outputs from the current detection means whether or not the EL elements are defective.

In the arrangement according to the present invention, the EL elements of the line head are caused to emit light, peak values of AC currents flowing through the electrodes of the EL elements are detected, and the EL elements are discriminated based on the detected current peak values.

BRIEF DESCRIPTION OF THE DRAWINGS

The accompanying drawings illustrate a presently preferred embodiment of the invention, and together with the general description given above and the detailed description of the preferred embodiment given below, serve to explain the principles of the invention.

DETAILED DESCRIPTION OF THE PREFERRED EMBODIMENTS

An electrophotography apparatus according to an embodiment of the present invention will be described below with reference to the accompanying drawings.

Figure 1:
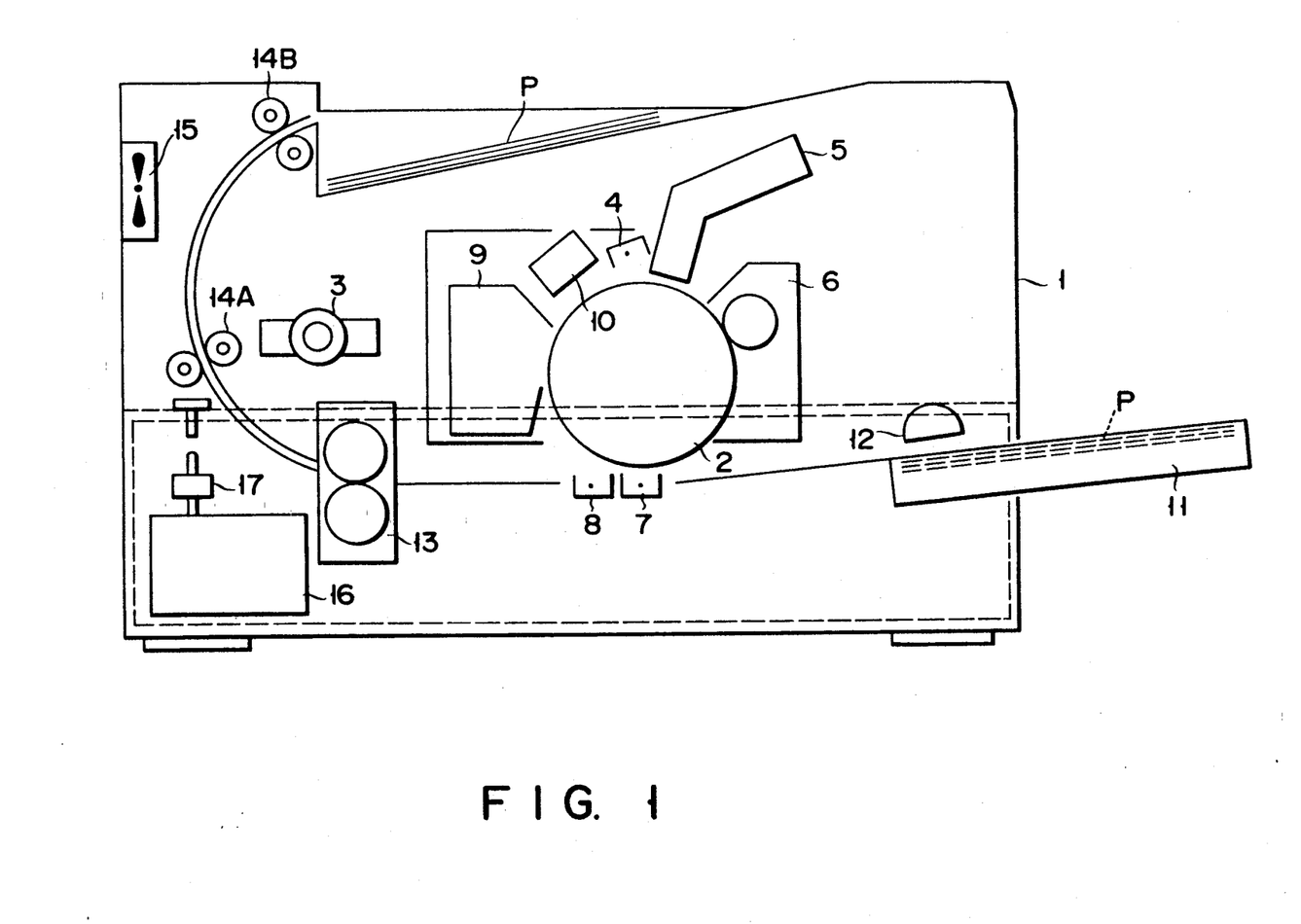
FIG. 1 is a schematic view showing an arrangement of an electrophotography apparatus according to an embodiment of the present invention.

As shown in FIG. 1, the apparatus of this embodiment comprises housing 1 which is axially supported at one end, so that a portion at the other end can be vertically opened. Photosensitive drum 2 whose surface is formed of a photoconductive material is arranged in substantially the central portion of housing 1. Photosensitive drum 2 is rotated by drive motor 3 in one direction, i.e., in the clockwise direction in FIG. 1. Charger 4 for charging the photosensitive body on the surface of photosensitive drum 2, an EEH (edge emitter array head) unit 5 for radiating light onto the photosensitive body charged by charger 4 to expose and record information thereon, thus forming an electrostatic latent image, developer 6 for developing the electrostatic latent image formed by exposure-controlled EEH unit 5 with a toner as a developing agent, transfer charger 7 for transferring the toner image on the photosensitive drum onto a conveyed paper sheet, discharger 8 for discharging the residual charge on the paper sheet, cleaning device 9 for removing the residual toner on photosensitive drum 2, and discharging device 10 for discharging photosensitive drum 2 to prepare for the next charging operation are arranged in turn around photosensitive drum 2 in accordance with a known electrophotography process.

EEH unit 5 comprises a line head including an array of a large number of EL (electroluminescence) elements as light-emitting elements, i.e., an edge emitter array head (EEH).

Transfer charger 7 is located below photosensitive drum 2, and paper sheet P is fed one by one at a predetermined timing from paper feed cassette 11 arranged at the other end side of housing 1 to transfer charger 7 upon operation of pickup roller 12.

After the toner image on photosensitive drum 2 is transferred onto fed paper sheet P by transfer charger 7 and fixed by fixing device 13, paper sheet P is then exhausted onto an upper portion of the housing by exhaust rollers 14A and 14B.

Drive motor 3 serves as a driving source of a convey mechanism for paper sheets P as well as a driving source of photosensitive drum 2.

Fan motor 15 for dissipating internal heat outside the apparatus, DC power supply device 16, cover-open switch 17 for detecting an open state of housing 1, and cutting off a 24-V power supply output line from DC power supply device 16, and the like are arranged in housing 1.

Figure 2:
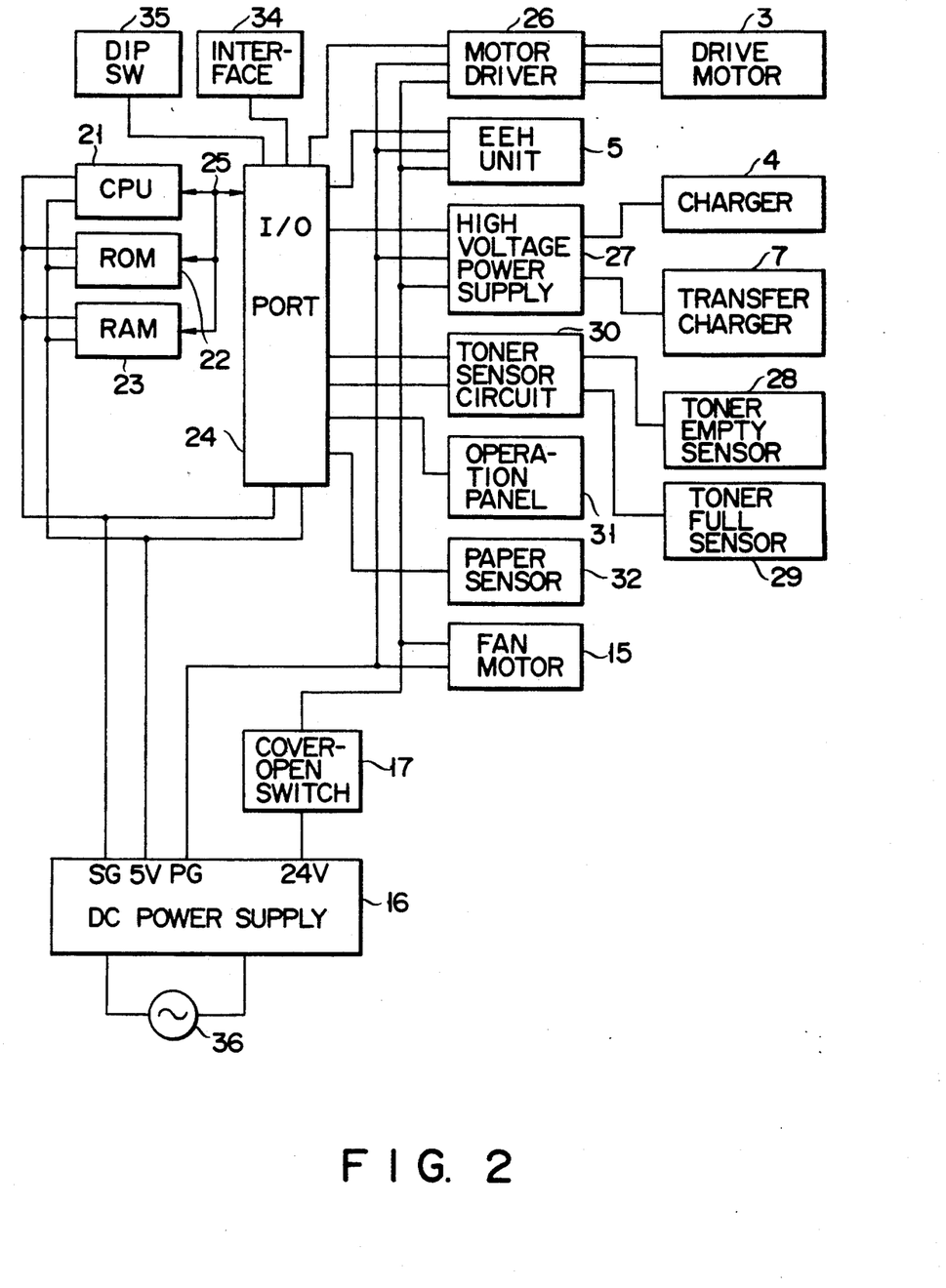
FIG. 2 is a block diagram showing an electrical circuit arrangement of the apparatus shown in FIG. 1.

FIG. 2 is a block diagram showing a circuit arrangement. In FIG. 2, reference numeral 21 denotes a CPU (microprocessor) constituting a control unit main body; 22, a ROM (read-only memory) for storing program data used by CPU 21 to control respective units; 23, a RAM (random-access memory) for storing image data, and various processing data sent from an external host computer; and 24, an I/O port. These components are connected through bus line 25.

I/O port 2 is connected to motor driver 26 for controlling drive motor 3, EEH unit 5, high voltage power supply 27 for supplying a high voltage to charger 4 and transfer charger 7, toner sensor circuit 30 for receiving signals from toner empty sensor 28 and toner full sensor 29 arranged in developer 6, operation panel 31 serving as an operation unit provided with key switches, indicators, and the like, paper sensor 32 for detecting conveyed paper sheet P, fan motor 15, interface 34 for receiving image information from the host computer, and dip switch 35.

DC power supply 16 is connected to commercial AC power supply 36 to generate a +5-V voltage between a 5-V terminal and an SG terminal, and to generate a +24-V voltage between a 24-V terminal and a PG terminal.

Figure 3:
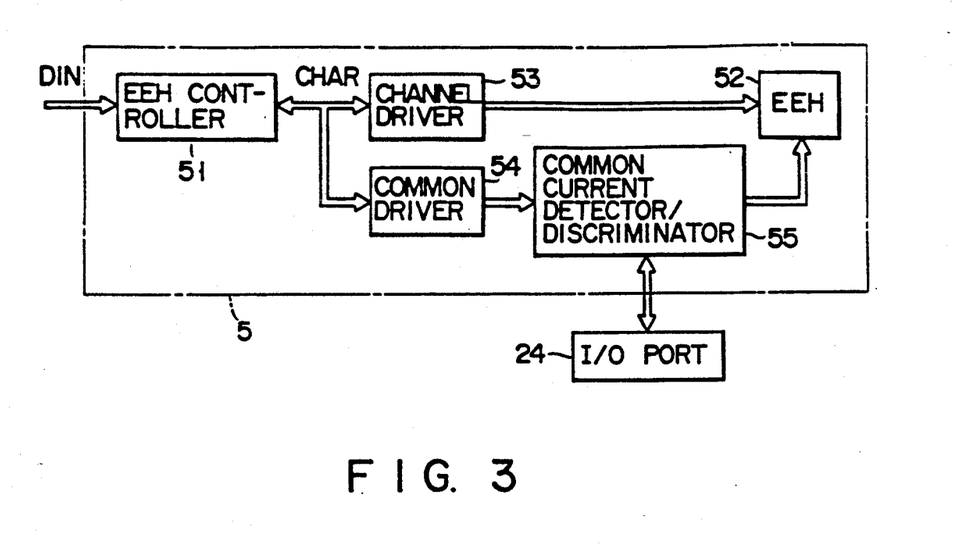
FIG. 3 is a circuit diagram showing an internal arrangement of an EEH unit in the arrangement shown in FIG. 2.
Figure 7A:
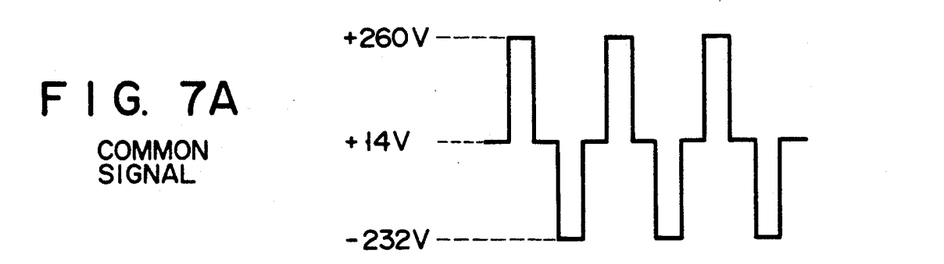
FIGS. 7A and 7B are waveform charts showing waveforms of a common signal (COM) and a block signal (BK) applied to the EEH unit in the arrangement shown in FIG. 3.

As shown in FIG. 3, EEH unit 5 comprises EEH controller 51 for converting externally input data DIN into character data CHAR, channel driver 53 for applying a voltage signal (FIG. 7B) to channel electrodes (block electrodes) of edge emitter array head (EEH) 52 on the basis of data CHAR from EEH controller 51, common driver 54 for applying a voltage signal (FIG. 7A) to common electrodes of EEH 52 on the basis of a signal from EEH controller 51, and common current detector/discriminator 55, inserted between common driver 54 and the common electrodes of EEH 52, for detecting a common current flowing through the common electrodes and discriminating defects of the EL elements in EEH 52.

Figure 4:
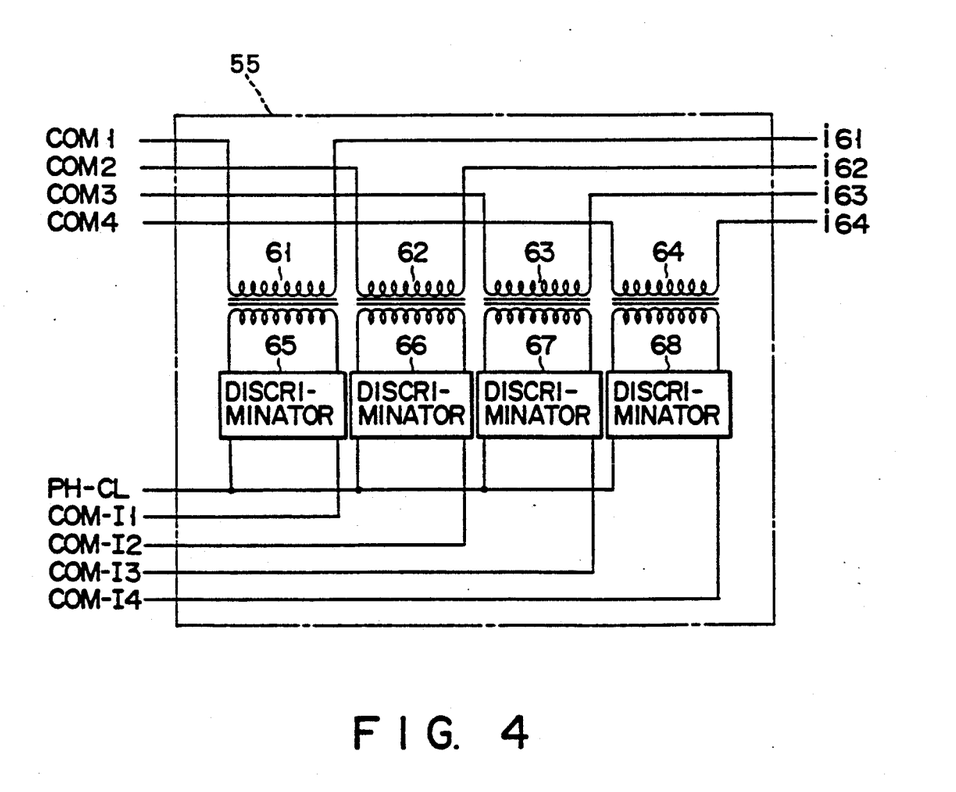
FIG. 4 is a diagram showing an arrangement of a common current detector/discriminator in FIG. 3.

As shown in FIG. 4, common current detector/discriminator 55 comprises four current transformers 61, 62, 63, and 64, and four discriminators 65, 66, 67, and 68.

Figure 5:
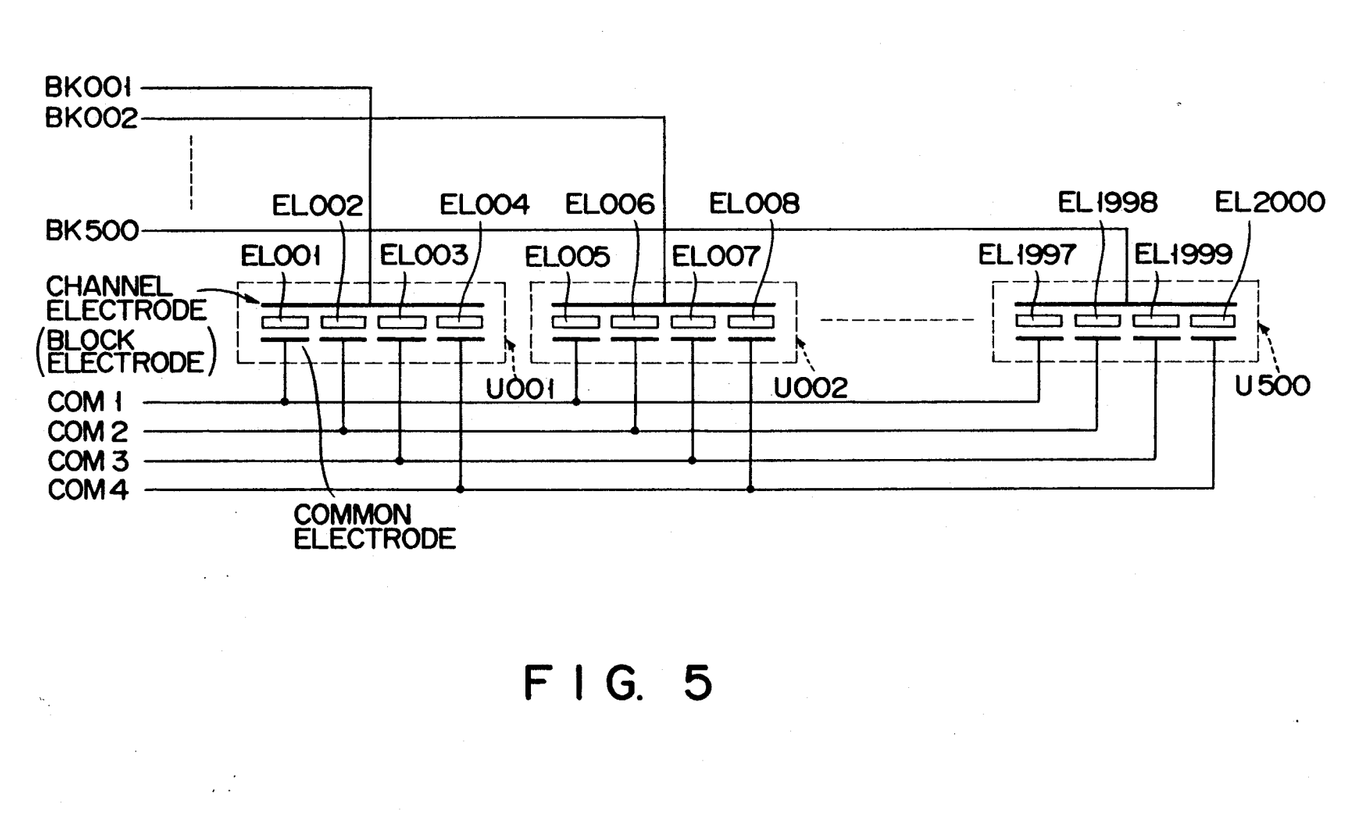
FIG. 5 is a diagram showing an arrangement of light-emitting elements of the EEH unit shown in FIG. 3.

As shown in FIG. 5, in EEH 52, for example, 2,000 elements EL001 to EL2000 are classified into groups U001 to U500 in units of four elements. Four channel electrodes (block electrodes) in each group are commonly connected. Block signals BK001 to BK500 are applied to EL groups U001 to U500 each of which is formed by four elements.

The common electrodes of first EL elements (EL001, EL005, . . . ) of the respective groups are connected to each other, the common electrodes of second EL elements (EL002, EL006, . . . ) of the respective groups are connected to each other, the common electrodes of third EL elements (EL003, EL007, . . . ) of the respective groups are connected to each other, and the common electrodes of fourth EL elements (EL004, EL008, . . . ) of the respective groups are connected to each other. Common signals COM1, COM2, COM3, and COM4 are applied to signal lines of the four common electrodes. Primary windings of current transformers 61 to 64 are serially inserted in paths of these common signals.

Discriminators 65 to 68 in FIG. 4 can have the same arrangement. An internal circuit arrangement of discriminator 65 will be exemplified below with reference to FIG. 6.

Figures 8A, 8B:
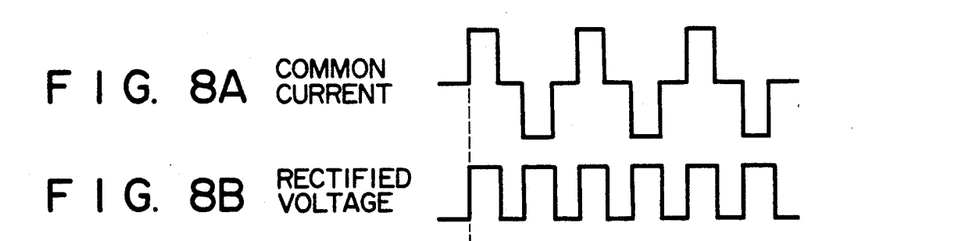
FIGS. 8A to 8D are waveform charts showing signal waveforms in main part of the circuit shown in FIG. 6.

When EEH 52 shown in FIG. 3 is driven, AC common current i61 having a waveform, as shown in FIG. 8A, flows in the primary side of current transformer 61. Current i61 is converted into an AC common voltage having the same waveform as that shown in FIG. 8A by current transformer 61. The AC common voltage is fullwave rectified by diode bridge 71, and capacitor 72 is charged by DC rectified output e61. DC rectified output e61 has a waveform shown in FIG. 8B.

Figure 6:
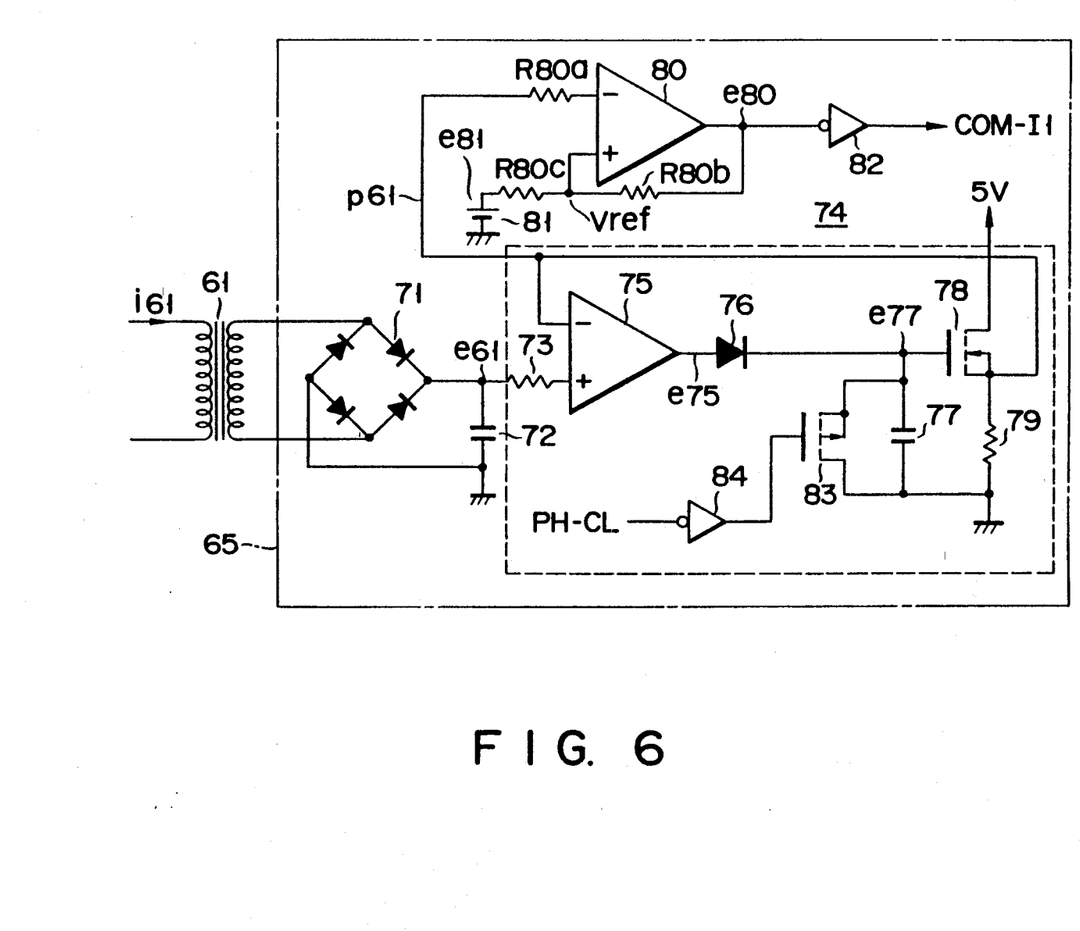
FIG. 6 is a circuit diagram showing an arrangement of a discriminator shown in FIG. 5.

DC output e61 corresponding to AC common current i61 is input to peak hold circuit 74. Peak value p61 of output e61 held by circuit 74 is compared with a reference voltage by a comparator circuit (80 to 82). A comparison result (COM-I1) from the comparator circuit becomes a discrimination output of discriminator 65.

More specifically, DC rectified output e61 is input to the noninverting input terminal (+) of operational amplifier 75. The inverting input terminal (−) of amplifier 75 receives peak value p61. When the noninverting input potential is higher than the inverting input potential (p61), amplifier 75 generates high-level output (+potential) e75.

Diode 76 connected to the output terminal of amplifier 75 is enabled since it is forward-biased by high-level output e75. Hold capacitor 77 is charged by high-level output e75 via enabled diode 76.

Potential e77 held in capacitor 77 is supplied to the gate of Nch MOS transistor 78. The drain of MOS transistor 78 is connected to a +5-V power supply, and its source is circuit-grounded through resistor 79. Peak value p61 of DC rectified output e61 is output from the source.

Note that the drain-source path of Pch MOS transistor 83 is connected in parallel with the two terminals of capacitor 77. The gate of transistor 83 receives hold/clear signal PH-CL shown in FIG. 8D via inverter 84. When hold/clear signal PH-CL is input, the drain and the source of transistor 83 are electrically connected to each other, and potential e77 held in capacitor 77 is cleared to almost 0 V.

Peak value p61 output from the source of MOS transistor 78 is supplied to the inverting input terminal (−) of operational amplifier 80. The output terminal of amplifier 80 is connected to its noninverting input terminal (+) via resistor R80b. The noninverting input terminal (+) receives reference potential Vref from reference voltage source 81 via resistor R80c.

Figures 8C, 8D:
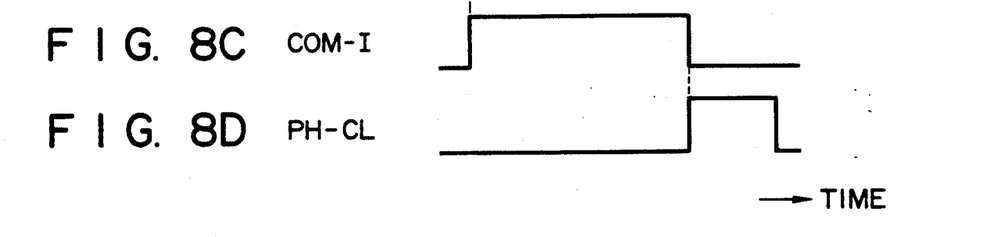

Operational amplifier 80 serves as a comparator circuit. When an inverting input potential (p61) of amplifier 80 is higher than a noninverting input potential (Vref), amplifier 75 generates low-level output (circuit-grounded potential) e80. An output (signal level=TTL level) obtained by level-inverting output e80 by inverter 82 becomes discrimination output COM-I1 of discriminator 65, as shown in FIG. 8C.

Although reference potential Vref is not equal to electromotive force e81 of reference voltage source 81, reference potential Vref can be adjusted by changing electromotive force e81.

Since a positive feedback circuit is formed by resistors R80b and R80c, the magnitude of reference potential Vref is changed in accordance with the level of output e80, and hence, input/output characteristics of comparator 80 can have hysteresis characteristics. The hysteresis characteristics can eliminate an undesirable phenomenon, i.e. an irregular change in discrimination output COM-I1 when peak value potential p61 is very close to reference voltage Vref.

When the hold voltage (p61) is higher than the reference voltage (Vref), comparator 80 discriminates that the EL elements are good, and outputs a low-level signal (e80). When the hold voltage (p61) is equal to or lower than the reference voltage (Vref), comparator 80 discriminates that the EL elements are defective, and outputs a high-level signal (e80). TTL-level discrimination signal COM-I1 obtained by level-inverting output signal e80 from comparator 80 by inverter 82 is supplied to I/O port 24.

Note that other discriminators 66, 67, and 68 respectively output discrimination signals COM-I2, COM-I3, and COM-I4.

In this embodiment with the above-mentioned arrangement, after the photosensitive body of photosensitive drum 2 is uniformly charged by charger 4, it is exposed by a light-emitting operation of EEH 52 of EEH unit 5, thus recording image information as an electrostatic latent image. The electrostatic latent image is developed with a toner by developer 6, and the toner image is transferred onto paper sheet P conveyed from paper feed cassette 11 by transfer charger 7. The paper sheet is exhausted via fixing device 13 and exhaust rollers 14A and 14B. On the other hand, the residual toner on the photosensitive body after the transfer operation is cleaned by cleaning device 9, and the photosensitive body is then discharged by discharging device 10.

In this manner, a printing operation for one paper sheet is performed, and is repeated for printing images on a plurality of paper sheets.

Figure 7B:
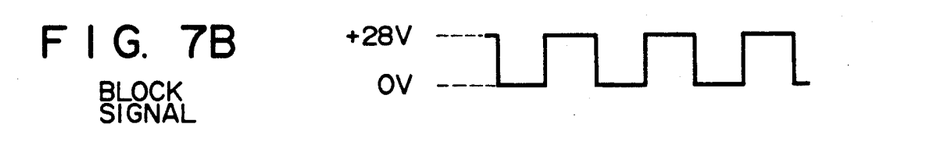

In this apparatus, when the EL elements of EEH 52 are discriminated, channel driver 53 supplies a block signal (BK) shown in FIG. 7B to the channel electrode of the EL elements in one group. In this state, common driver 54 supplies common signals COM1, COM2, COM3, and COM4 to the common electrodes of the EL elements in this group.

When the four EL elements in one group are caused to emit light in response to common signals COM1, COM2, COM3, and COM4, common currents i61 to i64 shown in FIG. 8A are detected by current transformers 61, 62, 63, and 64, respectively. The common currents are rectified by discriminators 65, 66, 67, and 68, and are converted into pulse voltage signals (e61 to e64), as shown in FIG. 8B. In this manner, peak values (p61 to p64) of the voltage signals (e61 to e64) corresponding to the common currents (i61 to i64) are held by hold circuits 74.

The held voltage signal peaks (p61 to p64) are compared with reference voltage 81 by comparators 80. If the EL elements are normal, the voltage signal peak level (p61) becomes higher than reference voltage level 81, and comparators 80 output low-level signals. Therefore, inverters 82 output high-level discrimination signals COM-I, as shown in FIG. 8C. If some EL elements are defective, the corresponding voltage signal peak levels (p61) become lower than the reference voltage levels (Vref), and comparators 80 output high-level signals e80. Therefore, inverters 82 output low-level discrimination signals COM-I.

In this manner, discriminators 65 to 68 output discrimination signals COM-I1, COM-I2, COM-I3, and COM-I4, and discrimination contents are informed to CPU 21 via I/O port 24.

Upon completion of discrimination, high-level hold/clear signal PH-CL shown in FIG. 8D is supplied to discriminators 65 to 68, and is inverted to a low-level signal by each inverter 84. Thus, MOS transistor 83 is enabled, and capacitor 77 is discharged. Thus, a hold state is canceled.

When the hold state is canceled, channel driver 53 supplies a channel signal to the channel electrodes (block electrodes) of the EL elements of the next group, and common driver 54 supplies common signals COM1, COM2, COM3, and COM4 to the common electrodes of the EL elements, thus starting a checking operation of the EL elements in the next group.

In this manner, the checking operations are performed in units of groups, and discrimination results are informed to CPU 21.

Therefore, as compared to a checking operation by visual confirmation after a printing operation, the EL elements can be quickly and reliably discriminated.

Since the EL elements are divided into groups each including four elements, and the EL elements are checked in units of groups, the current transformers and the discriminators to be used can be commonly used. Therefore, the number of necessary circuit parts can be reduced.

The present invention is applied to an electrophotography apparatus (electronic copying machine) using AC-driven EL elements as light-emitting elements. However, the arrangement of the EL elements is not limited to that shown in FIG. 5.

Common currents may be detected by utilizing photocouplers or Hall elements in place of the current transformers shown in FIG. 4. The arrangement of the discriminators shown in FIG. 4 is not limited to that shown in FIG. 6.

Note that the present invention can be applied to equipment such as a digital copying machine using a line head as well as a printer.

As described above, according to the present invention, an electrophotography apparatus which can quickly and reliably discriminate defects of light-emitting elements constituting a line head can be provided.

What is claimed is:

1. An electrophotography apparatus comprising:
   first means, including an array of plurality of electro-luminescence light-emitting elements, for exposing a charged photosensitive body to predetermined optical information based on combinations of a plurality of light-emitting operations of said light-emitting elements;
   second means for transferring information formed on said photosensitive body by said first means onto a recording medium; and
   third means for discriminating a condition of each of said light-emitting elements including:
      means for detecting peak values of AC drive current flowing through electrodes of said light-emitting elements; and
      comparing means for comparing the detected peak values with a predetermined reference value.

2. An apparatus according to claim 1, wherein:

said light-emitting elements are divided into a plurality of blocks, each of said plurality of blocks including a predetermined number of light-emitting elements therein;

one of said electrodes of each of said light-emitting elements in each of said plurality of blocks is connected to a respective one of a plurality of block electrode lines, said plurality of block electrode lines corresponding in number to said plurality of blocks, and another of said electrodes of each of said light-emitting elements in each of said blocks is connected to one of a plurality of common electrode lines, said plurality of common electrode lines corresponding in number to said predetermined number of light-emitting elements in each block, and wherein said apparatus further comprises:

means for supplying predetermined AC drive currents to said plurality of common electrode lines; and means for supplying predetermined AC drive signals synchronous with the AC drive currents to said plurality of block electrode lines.

3. An apparatus according to claim 2, wherein said detecting means includes means, connected to said common electrode lines, for independently detecting the AC drive currents; said comparing means includes:

means for sampling and holding peak values of detection output signals from said detecting means;

means for indicating that the light-emitting elements are defective by comparing the sampled and held peak values of the detection output signals with the predetermined reference value and, when magnitudes of the AC drive currents are smaller than the predetermined reference value, outputting discrimination signals; and said third means further includes:

means for discriminating a condition of each of said light-emitting elements in accordance with signal levels of the discrimination signals.

4. An electrophotography apparatus for performing exposure and recording of information onto a charged photosensitive body using a line head including an array of a large number of light-emitting elements, developing the information-recorded photosensitive body, and transferring a developed image onto a recording medium, the apparatus comprising:

current detection means for detecting peak values of AC currents flowing through electrodes of said light-emitting elements when the light-emitting elements emit light; and discriminating means for discriminating, based on current detection outputs from said current detection means, whether the light-emitting elements are defective.

5. An apparatus according to claim 4, wherein:

said light-emitting elements are divided into a plurality of groups; and said current detection means includes a plurality of current transformers that are respectively connected to corresponding ones of said plurality of groups of said light-emitting elements.

6. An apparatus according to claim 4, wherein said light-emitting elements include electroluminescence elements;

said current detection means includes a current transformer; and said discriminating means comprises:

a rectifier for rectifying a voltage signal from said current transformer, a holding circuit for holding the voltage signal rectified by said rectifier, a comparator for comparing the voltage signal held by said holding circuit with a reference voltage to discriminate conditions of said electroluminescence elements, and means for canceling a holding state of said holding circuit after discrimination by said comparator.

7. An apparatus for driving light-emitting elements which are integrated into a plurality of blocks each of which includes a predetermined number of the light-emitting elements, the light-emitting elements each having at least two electrodes, wherein one of said electrodes of each of the light-emitting elements in each of the blocks is commonly connected to one of a plurality of block electrode lines, and another of said electrode of the light-emitting elements in each of the blocks is respectively connected to one of a plurality of common electrode lines, said apparatus comprising:

controlling means coupled to the light-emitting elements in each of the blocks, for controlling said light-emitting elements, thereby recording given optical information onto a photosensitive body;

transferring means for transferring information formed on the photosensitive body by said controlling means onto a recording medium;

first detecting means for detecting AC drive currents respectively flowing through the common electrode lines of the light-emitting elements in each of said blocks;

second detecting means for detecting a peak value of each of the AC drive currents detected by said first detecting means;

comparing means for comparing the peak value detected by said second detecting means with a predetermined reference value so as to output a discrimination signal when the detected peak value is smaller than the predetermined reference value; and means coupled to said comparing means for discriminating a defective condition of the light-emitting elements.

* * * * *